United States Patent [19]

Bossennec et al.

[11] Patent Number: 4,555,705
[45] Date of Patent: Nov. 26, 1985

[54] SYSTEM FOR PROVIDING A SUMMARIZED INFORMATION ON THE LINE SPECTRUM FROM A DOPPLER RADAR SPECTRUM ANALYZER

[75] Inventors: Jean-Louis G. Bossennec, Elancourt; Jean-Claude A. Debuisser, Trappes; Philippe F. Farhi, Paris, all of France

[73] Assignee: International Standard Electric Corporation, New York, N.Y.

[21] Appl. No.: 442,935

[22] Filed: Nov. 19, 1982

[51] Int. Cl.⁴ .............................................. G01S 13/50
[52] U.S. Cl. ................................ 343/55 A; 324/77 B; 343/5 FT
[58] Field of Search ............... 343/55 A, 5 DP, 5 FT; 382/17; 324/77 B; 340/554; 364/485, 498, 518

[56] References Cited

U.S. PATENT DOCUMENTS 4,330,781  5/1982  Giustiniani ...................... 343/5 DP
4,389,648  6/1983  Luscombe et al. ............... 343/55 A Primary Examiner—Salvatore Cangialosi
Assistant Examiner—K. R. Kaiser
Attorney, Agent, or Firm—T. L. Peterson; J. S. Christopher

[57] ABSTRACT

A device providing summarized information from the digital spectrum analyzer output within a Doppler radar. Four memories, each of 256 word capacity, are included. Each of said memories is addressed by a group of eight bits among the sixteen bits provided by the spectrum analyzer and a logic circuit reconstitutes an elementary summary plot from the contents of said four memories. For a sixteen-line spectrum analyzer it is thus possible to replace a read-only memory for 64K, seven-bit words by the aforementioned four such read-only memories each of 256, seven-bit words.

3 Claims, 4 Drawing Figures

SYSTEM FOR PROVIDING A SUMMARIZED INFORMATION ON THE LINE SPECTRUM FROM A DOPPLER RADAR SPECTRUM ANALYZER

BACKGROUND OF THE INVENTION

This invention concerns a system to obtain summary data of the line spectrum supplied by a spectrum analyser from a Doppler radar. This system uses sixteen- or thirty-two-bit words (more generally $2^m$), called elementary raw plots, supplied by a contrast detector connectd to the output of a spectrum analyser and supplies summary data from this received information. For this reason, it will hereinafter be called "plot summarizer". With this type of plot summarizer, it is possible to reduce the amount of calculation needed to determine the speed of the target. This is especially useful in the case of a diversity radar.

Target speed is determined on the basis of the frequency shift caused by movement of that target. In the case of a transmission frequency diversity radar, a different Doppler frequency or shift corresponds to each transmitted signal frequency. If $Fe_i$ is the transmission frequency of index i (where i=1 to N) and if a different repetition, or sampling frequency $Fs_i$, is associated with each transmmission frequency, it will therefore be necessary to obtain a measurement of the Doppler shifts associated with each pair $(Fe_i, Fs_i)$. However, some measurements of this shift made with a spectrum analyser using different sampling frequencies $Fs_i$, will themselves differ because of spectrum foldovers. The true frequency shift value associated with that pair can be identified by comparing the N values each associated with one pair $(Fe_i, Fs_i)$, and the speed can thus be determined without ambiguity.

In fact, a single-speed target is detected for several contiguous lines on the spectrum analyser. The measurement will thus not consist of a single frequency value $g_i$ (accurate to $K_i.Fs_i$), but will consist of a set of n contiguous values $\{g_{ik}, k=1$ to n$\}$. It is shown (sixteen-point Fourier transform property after Tchebycheff's weighting with sixty-decibel rejection) that a single-speed target is detected for a maximum of five cyclically contiguous lines on the spectrum analyser, that is to say supplies at most five lines at high enough levels for a maximum of five $g_{ik}$ Doppler shift values (n=5) determined to an accuracy of $K_i.Fs_i$. In more general terms, for $2^m$ bits, $n=2^m/4+1$ will be obtained. So as to limit the amount of calculation required to determine the target's speed, it is desired to reduce these (one to five) contiguous lines in one way or another to a single value $g_i$, summarizing them. This is the purpose of the plot summarizer which must also differentiate between single-speed targets and other targets, so as to avoid giving summary values having no direct physical significance.

SUMMARY OF THE INVENTION

Thus, the object of the invention is to define a plot summarizer supplying a digital signal called an elementary summary plot, PRE, for each range corresponding to a given delay of the received signal, this digital signal consisting of one target detection bit D, one bit V indicating whether the target is a single-speed target and one word of (m+1) bits containing information on the speed of the target, if applicable, said plot summarizer receiving a digital signal called an elementary raw plot, PBE, for each range, from a contrast detector, this signal consisting of a word of $2^m$ bits. This contrast detector itself receives a signal supplied by a $2^m$ point spectrum analyser consisting of a weighting circuit, a $2^m$ point Fourier transform and a modular extractor, the weighting effected by the weighting circuit being such that it limits the maximum number of cyclically contiguous lines for which a single-speed target is detected to $2^m/4+1$.

One solution consists in addressing a read-only memory with the bits supplied by the contrast detector detecting the spectrum analyser lines having a sufficient amplitude, each memory location containing the elementary summary plot PRE. This solution necessitates relatively extensive equipment, for a read-only memory with a capacity of sixtyfour K words of seven bits is required for a sixteen-line spectrum analyser.

Thus, according to the invention, this object is achieved in that the $2^m$ bits of the elementary raw plot are distributed among four read-only memories, a first read-only memory being addressed by the first group composed of bits 0 to $2^{m-1}-1$ of the elementary raw plot, a second memory being addressed by the second group consisting of bits $2^{m-2}$ to $2^{m-1}+2^{m-2}-1$ of the elementary raw plot, a third memory being addressed by the third group, complementary to the first group, consisting of bits $2^{m-1}$ to $2^m-1$ of the elementary raw plot, and a fourth memory being addressed by the fourth group, complementary to the second group, composed of bits $2^{m-1}+2^{m-2}$ to $2^m-1$ and 0 to $2^{m-2}-1$ of the elementary raw plot, and in that the elementary summary plot is reconstituted from the contents of the four memories by a logic circuit.

In the special case of use of a sixteen-line spectrum analyser, it is thus possible to replace a read-only memory of sixty-four K words of seven bits by four read-only memories containing two hundred and fifty-six words of seven bits.

The invention will be better understood and other characteristics will be brought out in the following description and attached drawings.

DETAILED DESCRIPTION

Figure 1:
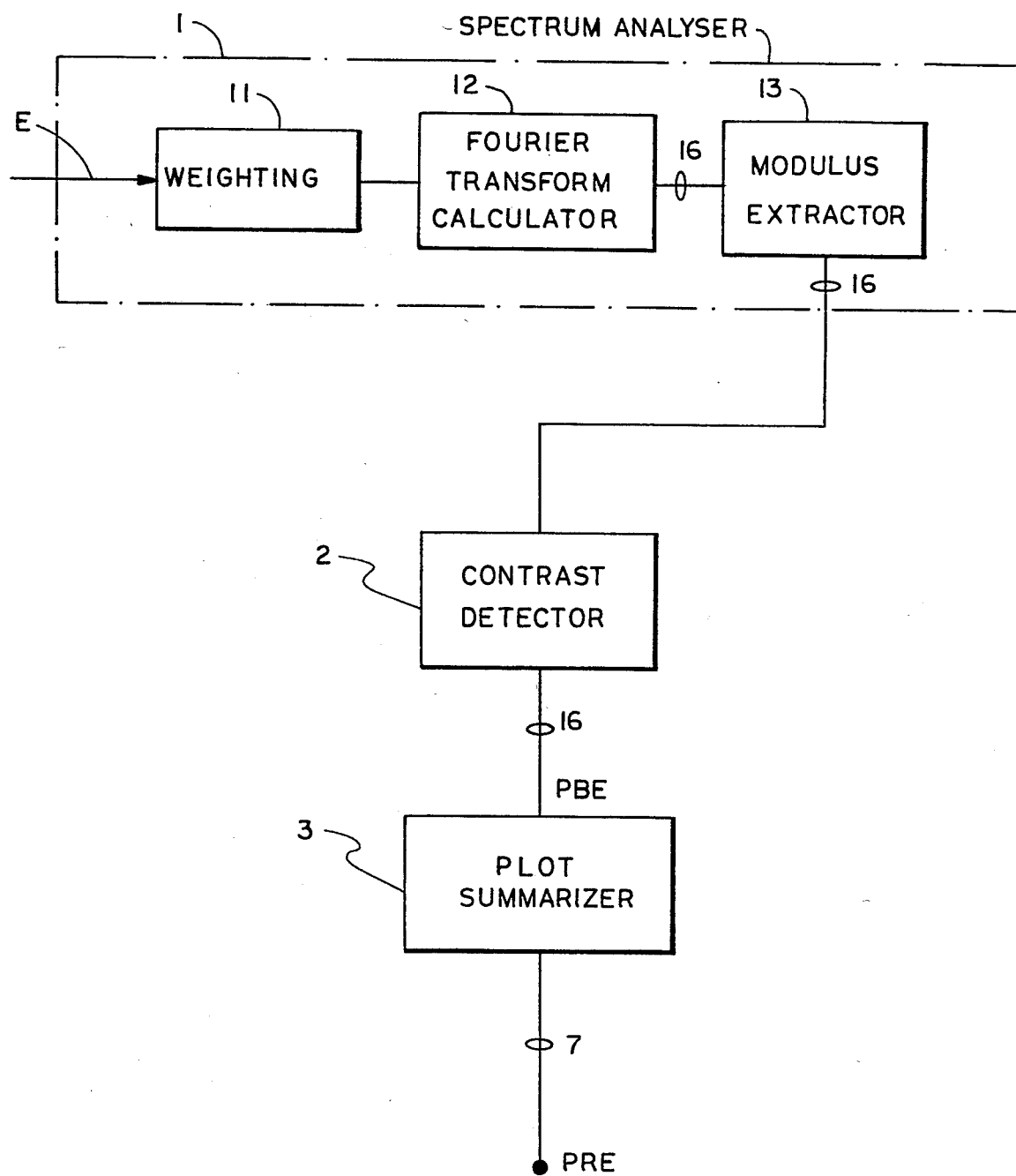
FIG. 1 represents a bloc diagram showing the spectrum analyser contrast detector and plot summarizer according to the invention.
Figure 2:
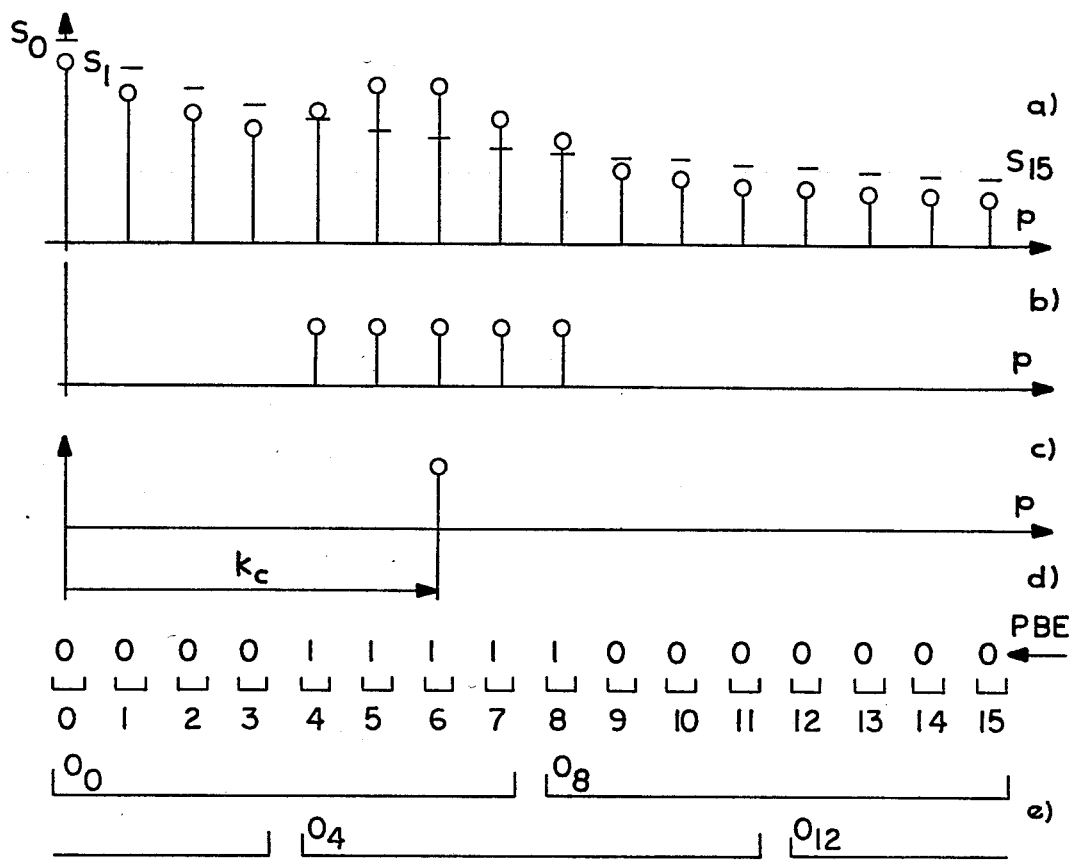
FIG. 2 represents (a) the signal supplied by a sixteen-line spectrum analyser, (b) the signal supplied by the contrast detector, (c) a possible estimated spectrum value, and (d) the elementary raw plot (PBE) which is divided into four eight-bit bytes $O_0$, $O_4$, $O_8$ and $O_{12}$, the groupings of which are shown in (e)

FIG. 1 shows a block diagram with a spectrum analyser 1 and a contrast detector 2 supplying sixteen bits to the plot summarizer 3. The spectrum analyser 1 receives a digitized video signal from the radar receiver at its input E. It consists of a weighting circuit 11, a sixteen-point Fourier transform calculator 12 and a modulus extractor 13. This spectrum analyser supplies sixteen digital elements of information on the amplitude of the spectrum lines of the signal analysed. One example of the spectrum provided is shown in (a) on FIG. 2. A contrast detector with sixteen-threshold $S_0, S_1 \ldots S_p \ldots S_{15}$ receives these sixteen digital elements of information and supplies sixteen binary elements of information corresponding to the presence or absence of lines within the effective spectrum of the signal analysed. The signal supplied by the contrast detector, in response to the signal shown in (a) of FIG. 2, is represented in (b) of FIG. 2. This sixteen-bit word supplied by the contrast detector is called the elementary raw plot (PBE); it is represented in (d) of FIG. 2. The plot summarizer 3 has the function of concentrating the information contained in the elementary raw plot in such a manner as to make it more easily usable.

The plot summarizer makes one of the following three decisions, based on the elementary raw plot:
there is no target;
there is a target without estimated spectrum;
there is a target with estimated spectrum.

In the latter case, the plot summarizer also supplies the value of this spectrum estimate which is an estimate of the reduced Doppler shift of the target detected. It will be seen that the value of this spectrum estimate can be contained in five bits for a sixteen-line spectrum analyser.

The output of the plot summarizer will thus be a seven-bit word called the elementary summary plot (PRE) and made up as follows:
one bit D indicating whether a target exists;
one bit V indicating whether the target is a single-speed target;
the remaining five bits contain the estimated value, if applicable.

The existence of a target causes one or several logic 1 levels to appear. The seventh bit of the elementary summary plot, bit D, must therefore be at level 1 if at least one of the bits of the elementary raw plot (PBE) is at level 1.

In so far as the sixth bit of the elementary summary plot (PRE) is concerned, that is to say bit V, it is demonstrated (Fourier transform property after Tchebycheff's weighting with sixty-decibel rejection) that a single-speed target is detected for a maximum of five cyclically contiguous lines of the spectrum analyser. It will thus be decided that a single-speed target exists if the elementary raw plot (PBE) contains a group of n bits which are cyclically contiguous, at a level 1 with $n=1$ to 5, starting from the $k_i$th bit, the other $16-n$ bits all being at level zero. When this condition is fulfilled, bit V must then be at level 1.

It is now necessary to assign a value to this spectrum estimate. For example, the barycenter of n cyclically contiguous bits at level 1 can be taken as a value. Even values of n then introduce sixteen new values corresponding to the mid-point of the intervals between the sixteen points supplied by the spectrum analyser. These points are represented in (c) of FIG. 2, as well as value $k_c$ of the estimated spectrum of the example selected. This estimated spectrum can therefore assume thirty-two possible values and thus requires five bits.

To summarize this:
if the elementary raw plot has a value equal to zero, it is decided that there is no target ($D=0, V=0$);
if the elementary raw plot has a value other than zero, it is decided that there is a target ($D=1$);
if, in addition, the non-zero bits fulfill the group criterion, it is decided that the target is a single-speed target ($D=1, V=1$);
if the non-zero bits do not fulfill the group criterion, it is deciced that there is a target which is not of single speed ($D=1, V=0$).

One solution to obtain this elementary summary plot (PRE) would consist in addressing a read-only memory with the elementary raw plot (PBE), each memory location containing the elementary summary plot (PRE) corresponding to that address and as defined hereinabove. However, this solution would require relatively expensive equipment, for it requires a read-only memory of sixty-four K words of seven bits. The solution according to the invention consists of using four read-only memories containing two hundred and fifty-six words of seven bits and using an algorithm such that the elementary summary plot (PRE) can be reformed on the basis of the contents of these memories.

Figure 3:
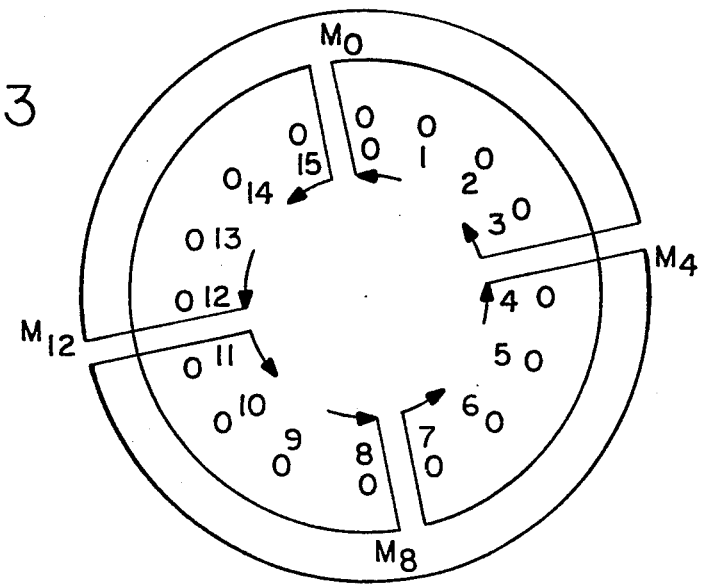
FIG. 3 represents a cyclical diagram of the elementary raw plot (PBE) and the distribution of bits among the memories.
Figure 4:
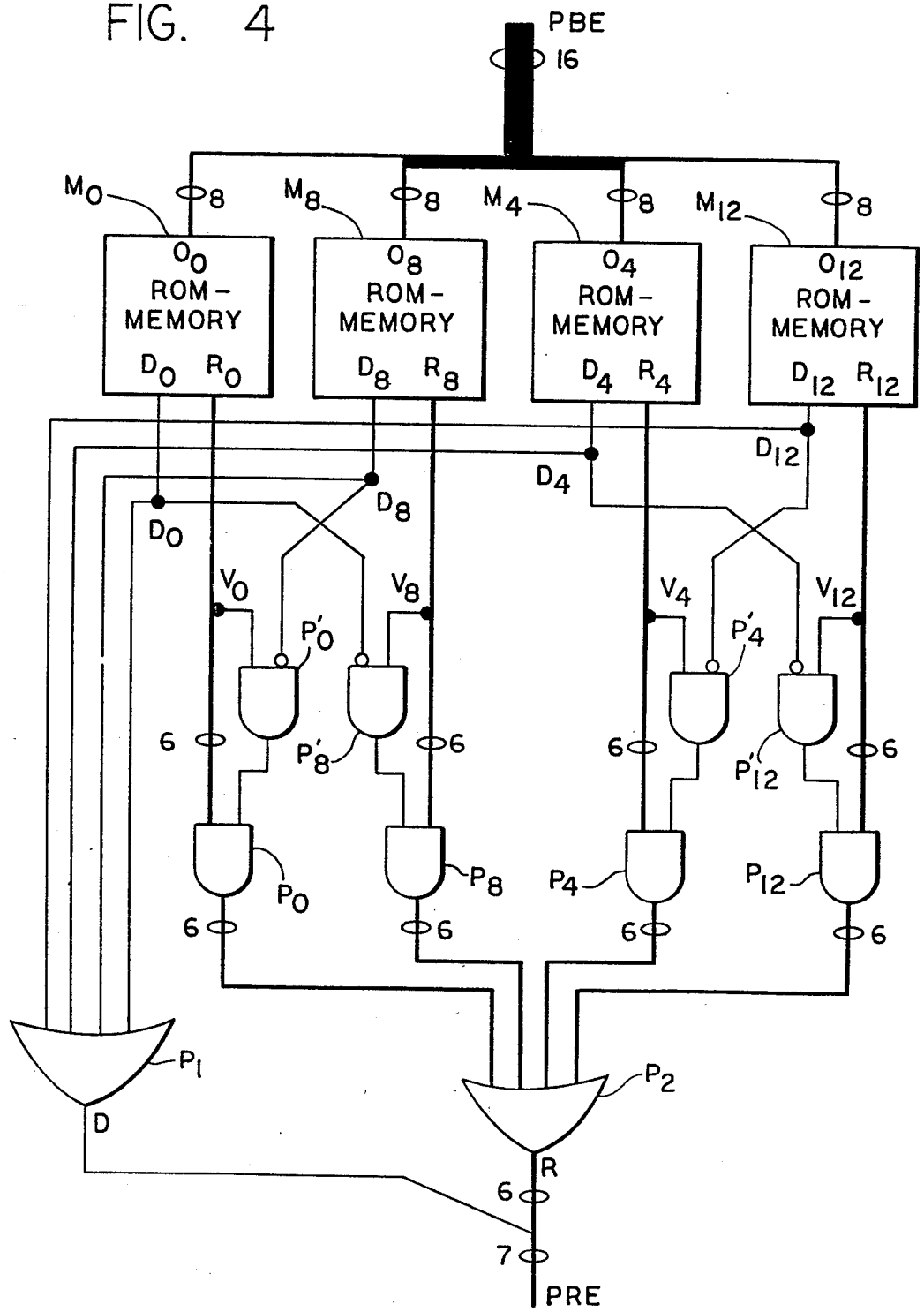
FIG. 4 represents a possible design using the solution according to the invention.

FIG. 4 represents a simplified logic diagram demonstrating this algorithm. The different bits of the elementary raw plot (PBE) are divided among the four read-only memories $M_0$, $M_8$, $M_4$ and $M_{12}$, each of the memories being addressed by eight bits out of the sixteen bits of the elementary raw plot. The groups of bits used to address these memories are eight-bit bytes $O_0$, $O_8$, $O_4$ and $O_{12}$ represented in (e) of FIG. 2. Memory $M_0$ is addressed by byte $O_0$ consisting of bits 0 to 7 of the elementary raw plot (PBE). Memory $M_4$ is addressed by byte $O_4$ consisting of bits 4 to 11 of the elementary raw plot (PBE). Memory $M_8$ is addressed by byte $O_8$, complementary to byte $O_0$, consisting of bits 8 to 15 of the elementary raw plot, and memory $M_{12}$ is addressed by byte $O_{12}$, complementary to byte $O_4$, consisting of bits 12 to 15 and 0 to 3 of the elementary raw plot. FIG. 3 shows a circular representation of the bits of the elementary raw plot and those bits of the elementary raw plot used to address the different memories ($M_0$, $M_4$, $M_8$, $M_{12}$) can be seen on this diagram. This representation will be useful in order to understand the way in which the algorithm used acquires the contents of the memories, especially the estimated spectrum value.

Each read-only memory of two hundred and fifty-six words contains the elementary summary plots corresponding to the elementary raw plot (PBE$_0$, PBE$_4$, PBE$_8$ or PBE$_{12}$) associated with that memory. This elementary raw plot associated with the memory consists of the byte ($O_0$, $O_4$, $O_8$ or $O_{12}$) associated with that memory, in addition to zeros. These elementary summary plots (PRE$_0$, PRE$_4$, PRE$_8$ or PRE$_{12}$) associated with a memory are seven-bit words known as pseudosummaries and consist of a "target present" bit ($D_0$, $D_4$, $D_8$ or $D_{12}$) in the associated elementary raw plot considered, one bit ($V_0$, $V_4$, $V_8$ or $V_{12}$) indicating that the target has single speed in this same associated raw plot, and five bits giving the estimated spectrum calculated in the manner explained hereinabove from this same associated elementary raw plot. The set made up of the estimated spectrum associated with a memory in addition to the bit ($V_0$, $V_4$, $V_8$ or $V_{12}$) indicating that the target has single speed is called R; there will thus be four sets ($R_0$, $R_4$, $R_8$, $R_{12}$) associated with the memories.

The elementary summary plot (PRE) is then reconstituted, from the pseudosummaries, in the following manner:
it is decided that there is a target if at least one of the pseudosummaries indicate that there is a target: $D=1$ if ($D_0=1$) or ($D_4=1$) or ($D_8=1$) or ($D_{12}=1$);
it is decided that the target is of single speed if at least one of the pseudosummaries (PRE$_0$, PRE$_4$, PRE$_8$ or PRE$_{12}$) indicates that the target is of single speed and if the pseudosummary corresponding to the complementary byte indicates that there is no target: V=1 if ($V_0=1$ and $D_8=0$) or ($V_4=1$ and $D_{12}=0$) or ($V_8=1$ and $D_0=0$) or ($V_{12}=1$ and $D_4=0$).

Under these conditions, the estimated spectrum is given by the pseudosummary or pseudosummaries which indicated the presence of a single-speed target.

The logic diagram showing this algorithm is represented in FIG. 4. It has four conventional two-input AND gates ($P'_0$, $P'_8$, $P'_4$, $P'_{12}$), four multiple AND gates ($P_0$, $P_8$, $P_4$, $P_{12}$) with a control input and a six-bit multiple input, a multiple OR gate $P_2$ and a conventional OR gate $P_1$. The AND gate $P'_0$ receives bit $V_0$ at its uncomplemented input and bit $D_8$ at its complemented input; its output controls AND gate $P_0$. This multiple gate $P_0$ receives the first six bits $R_0$, and will only transmit these bits $R_0$ if the output of $P'_0$ is at level 1, that is to say if the $PRE_0$ contents supplied by memory $M_0$ correspond to a single-speed target ($V_0=1$) and if the $PRE_8$ contents of memory $M_8$ do not correspond to any target ($D_0=0$). The operation of the multiple AND gates $P_8$, $P_4$ and $P_{12}$ is identical. These multiple gates will only transmit their first six bits $R_8$, $R_4$ or $R_{12}$ if the pseudosummary supplied by their associated memory corresponds to a single target and if the pseudosummary of the complementary memory does not correspond to any target. The OR gate $P_1$, receiving the seventh bits ($D_0$, $D_8$, $D_4$ and $D_{12}$) associated with each memory, will transmit a logic level 1 at its output if the pseudosummary supplied by one of the memories corresponds to a target, that is to say if one of the seventh bits is at level 1. This output constitutes the seventh bit of the elementary summary plot (PRE). The multiple OR gate $P_2$ receives the outputs of the four multiple AND gates $P_0$, $P_8$, $P_4$ and $P_{12}$ and supplies the first six bits of the elementary summary plot PRE at its output. These bits are all zero if there is no target or if there are several targets, for, in the latter case, a memory will receive bits corresponding to several targets, and will thus only transmit 0 logic levels or will receive bits corresponding to a single target. However, these non-zero bits transmitted will be unable to pass through its associated multiple gate, for it will be blocked by the seventh bit supplied by its complementary memory.

By reference to FIG. 2, it can be seen that in the event that the target is of single speed and that the elementary raw plot contains only one group of one to five cyclically contiguous bits, only the memory or memories of which the addressing byte contains this complete group will be able to transmit the estimated spectrum value which they contain.

Of course, the invention is clearly not limited to the embodiment described here; in particular, it would have been possible to describe the invention with a thirty-two line spectrum analyser or more generally a $2^m$ line spectrum analyser. The target speed information must then be given by a word of $m+1$ bits and the maximum number of lines for which a single-speed target is detected is then $2^m/4+1$ for a Tchebycheff's weighting circuit with sixty-decibel rejection. Four memories of $2^m$ words of $m+3$ bits will then replace one memory of $2^{m+1}$ words of $m+3$ bits.

What is claimed is:

1. A Doppler radar plot summarizer for moving targets supplying a digital signal for one or more targets, said signal for each target range called an elementary summary plot, PRE, corresponding to a given delay of the received signal, said digital signal consisting of one target detection bit D, one bit V indicating whether the target is a single-speed target and one word of $m+1$ bits containing information on the speed of that target, if the target is of a single speed, wherein said plot summarizer receives a digital signal called an elementary raw plot, PBE, from a circuit comprising in series a $2^m$ point spectrum analyser, made up of a weighting circuit, a $2^m$ Fourier transform calculator and a modulus extractor, and a contrast detector furnishing, for each of these target ranges, said elementary raw plot consisting of one word of $2^m$ bits, the weighting performed by said weighting circuit being such that it limits the maximum number of cyclically contiguous lines for which a single-speed target is detected to $2^m/4+1$, said plot summarizer comprising:

four read-only memories respectively addressed by a first, a second, a third and a fourth group of bits of said elementary raw plot and providing at their outputs corresponding digital signals of $m+3$ bits called pseudosummaries, said first group consisting of bits 0 to $2^{m-1}-1$ of the elementary raw plot, said second group consisting of bits $2^{m-2}$ to $2^{m-1}+2^{m-2}-1$ of the elementary raw plot, said third group, complementary to said first group, consisting of bits $2^{m-1}$ to $2^m-1$ of the elementary raw plot and said fourth group, complementary to said second group, consisting of bits $2^{m-1}+2^{m-2}$ to $2^m-1$ and 0 to $2^{m-2}-1$ of the elementary raw plot; and a logic circuit for reconstituting said elementary summary plot from said pseudosummaries provided by said four read-only memories.

2. A plot summarizer according to claim 1, wherein each of said pseudosummaries includes a target detection bit, a single-speed target bit and an $m+1$ bit word giving an estimated spectrum, and wherein said logic circuit comprises:

four multiple-input AND gates, each connected to a separate one of said four memories, each of said multiple-input AND gates having a control input and a plurality of inputs receiving an $m+1$ bit word and a single-speed target bit from the memory to which it is connected;

four two-input AND gates, one for each of said four memories, each two-input AND gate having an output connected to the control input of one of said multiple-input AND gates, an uncomplemented input receiving the single-speed target bit from a memory to which the multiple-input AND gate is connected and a complemented input receiving the target detection bit from the memory addressed by the group of bits complementary to the group addressing the memory to which the multiple-input AND gate is connected;

a multiple OR gate having four multiple inputs respectively connected to the outputs of said four multiple AND gates, said OR gate supplying said bit V and said word containing information on the speed of the target of said elementary summary plot; and an OR gate having four inputs receiving respectively the target detection bits from said four read-only memories, said OR gate supplying said target detection bit D of said elementary summary plot.

3. A plot summarizer according to claim 1, wherein each of said pseudosummaries includes a target detection bit, a single-speed target bit and an $m+1$ bit word giving an estimated spectrum and wherein said pseudosummaries are supplied by said read-only memories under the control of addresses formed respectively by said first, second, third and fourth group of bits with zeros added in order to make up elementary raw plots.

* * * * *